US012239896B1

(12) United States Patent
Hughes, IV

(10) Patent No.: US 12,239,896 B1
(45) Date of Patent: Mar. 4, 2025

(54) ACES GUIDE: THE UNBEATABLE GOLF GUIDEBOOK THAT ELEVATES YOUR GAME AND LOWERS YOUR SCORES

(71) Applicant: HCI Hughes Company Innovations Inc., Edina, MN (US)

(72) Inventor: James H. Hughes, IV, Minnetrista, MN (US)

(73) Assignee: HCI Hughes Company Innovations Inc., Edina, MN (US)

( * ) Notice: Subject to any disclaimer, the term of this patent is extended or adjusted under 35 U.S.C. 154(b) by 0 days.

(21) Appl. No.: 18/387,932

(22) Filed: Nov. 8, 2023

Related U.S. Application Data

(60) Provisional application No. 63/446,415, filed on Feb. 17, 2023.

(51) Int. Cl.
*A63B 71/06* (2006.01)
*G09B 29/12* (2006.01)
*A63B 102/32* (2015.01)

(52) U.S. Cl.
CPC .......... *A63B 71/0622* (2013.01); *G09B 29/12* (2013.01); *A63B 2071/0691* (2013.01); *A63B 2102/32* (2015.10)

(58) Field of Classification Search
CPC .............. A63B 71/0622; A63B 71/06; A63B 2071/0691; A63B 2102/32; A63B 102/32; G09B 29/12

USPC ....... 283/34, 48.1, 49, 50, 52.1; 281/5, 15.1; 434/247, 252; 40/124.01
See application file for complete search history.

(56) References Cited

U.S. PATENT DOCUMENTS

| 5,636,872 A * | 6/1997 | Gamer | A63B 71/0672 283/49 |
| 2021/0035455 A1* | 2/2021 | Hall | B64U 70/90 |
| 2024/0104927 A1* | 3/2024 | Tsurumi | G06V 40/103 |

FOREIGN PATENT DOCUMENTS

WO   WO-2022102491 A1 *   5/2022   ............ B25J 9/1664

* cited by examiner

*Primary Examiner* — Justin V Lewis
(74) *Attorney, Agent, or Firm* — O'Connor & Company; Ryan P. O'Connor

(57) ABSTRACT

This invention pertains to a golf guidebook, either physical or electronic, that incorporates golf-related data specific to a selected golf course. The data is computationally derived from sensor information, captured by an unmanned aerial vehicle flown above the course. The guidebook provides high-resolution imagery, distance mark-ups, and elevation deltas for individual golf holes. It may also feature putting-green maps with contour lines, interactive user-input fields, and synchronization capabilities with a mobile application for performance tracking. Additional features may include reusable or replaceable pages, environmental resistance, and an inverted color scheme for enhanced visibility in direct sunlight.

27 Claims, 2 Drawing Sheets

ACES GUIDE: THE UNBEATABLE GOLF GUIDEBOOK THAT ELEVATES YOUR GAME AND LOWERS YOUR SCORES

PRIORITY DATA

This patent application is a non-provisional application with priority to U.S. Provisional Patent App. No. 63/446,415, filed on Feb. 17, 2023, which is hereby incorporated by reference herein.

FIELD OF THE INVENTION

The present invention generally relates to the fields of golf, recreational sports, aerial data collection, and data processing. More specifically, the invention pertains to an innovative system and method for enhancing the golfing experience by utilizing Unmanned Aerial Vehicles (UAVs) equipped with various types of sensors, including but not limited to optical and LiDAR sensors, to capture sensor data. This sensor data is computationally processed to generate golf-related data, which is then presented in a compact, user-friendly guidebook. This guidebook can exist in both physical and digital formats, herein referred to as the "Aces Guide," designed to provide golfers with strategic insights and practical advice to improve their performance and enjoyment of the game.

BACKGROUND OF THE INVENTION

Since the beginning of human history, mankind has played and watched games. In more recent history, games, sports, and recreational activities have become more organized and enjoyed by billions of people around the world.

For many people, golfing is one of their major passions in life, and millions of people around the world make a living in the golf industry. Golfing, while a popular pastime, is not an easy sport. Depending on the objectives and the skill of the person, golf can present numerous difficulties and frustrations.

Despite its challenges, golfs' popularity remains unwavering. Yet, the sport often requires strategic planning and detailed knowledge about the golf course to improve performance and enjoyment of the game. Traditional methods for gaining these insights, such as personal experience and advice from other golfers, are often limited and can lack the precision desired by the players.

With advances in technology, various solutions have been proposed to help golfers. These range from basic yardage books to sophisticated electronic devices. However, many of these solutions have limitations. Yardage books, for example, do not provide high-resolution information about the course, while electronic devices can be complex, expensive, and difficult to use.

Therefore, a need remains for a system that can provide golfers with comprehensive, high-resolution, and user-friendly information about golf courses, to improve strategic planning and overall experience of the game.

It is in the context of the aforementioned background that the present invention was developed.

SUMMARY OF THE INVENTION

Figure 1:
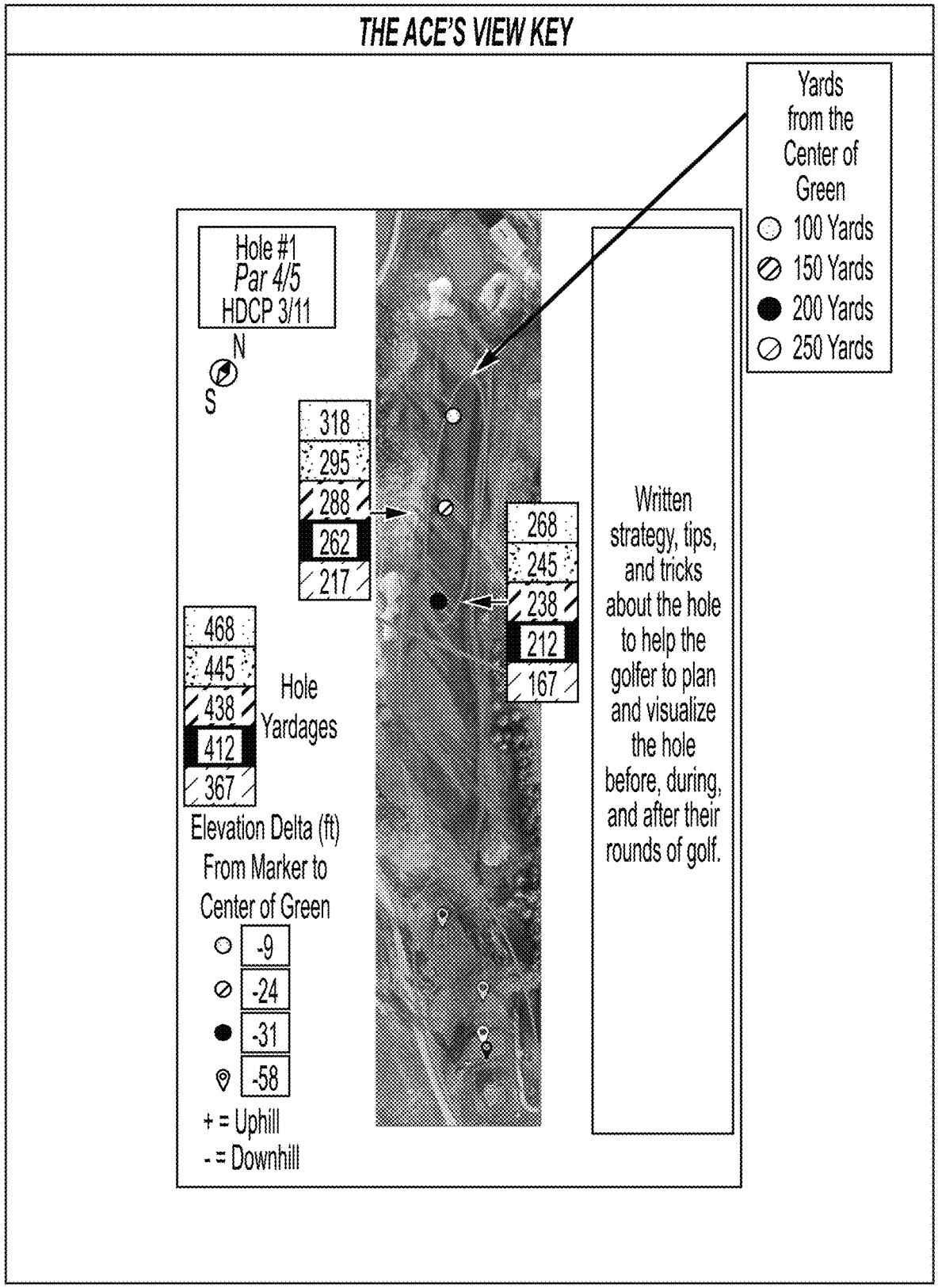
FIG. 1 is an exemplary graphical illustration of a page of a physical guidebook with golf-related data pertaining to one golf hole, showing high-resolution photographic imagery of terrain and obstacles, distance mark-ups, elevation deltas, and written strategy, tips, and tricks applicable to the golf hole.

The present invention provides a novel system for enhancing the golfing experience through the use of both physical and electronic guidebooks, referred to as the "Aces Guide." The guidebooks include data on selected golf courses, collected via sensor data from unmanned aerial vehicles (UAVs) flown above these courses.

The physical guidebook comprises a plurality of pages with golf-related data, including high-resolution photographic imagery of terrain and obstacles for individual golf holes. These images and other golf-related data are computationally derived from sensor data, which may be captured by optical sensors such as photographic cameras or LiDAR sensors. In addition, the guidebook includes distance mark-ups and elevation deltas for individual golf holes and provides putting-green maps with contour lines to indicate elevation changes.

The physical guidebook also incorporates interactive user-input fields that allow for the input of shot distance, club selection, player performance, environmental conditions, hole notes, and other relevant information. These fields can be further captured and analyzed by integrating the guidebook with a mobile application, providing additional insights to help improve the user's game.

Moreover, the physical guidebook is designed to withstand environmental challenges like rain, wind, sunlight, heat, humidity, dirt, dust, and mechanical stress. An inverted color scheme with a dark background and light text is utilized to enhance visibility in direct sunlight. The guidebook is compact, with an areal size of less than 60 square inches, making it easy to carry and use on the golf course.

The electronic guidebook offers similar features, with golf-related data displayed to the user. The data is computationally derived from UAV-captured sensor data and includes distance mark-ups, elevation deltas, and putting-green maps with contour lines. Like its physical counterpart, the electronic guidebook has interactive user-input fields that can be integrated with a mobile application for further analysis. The electronic guidebook also uses an inverted color scheme for better visibility in direct sunlight.

Through these features, the present invention aims to substantially improve the strategic planning, performance, and overall enjoyment of the golfing experience.

Some embodiments provide an electronic golf guidebook comprising golf-related data displayed to a user, wherein the golf-related data pertains to a selected golf course, wherein at least some of the golf-related data is computationally derived from sensor data captured from an unmanned aerial vehicle remotely and controllably flown above the selected golf course, and wherein the golf-related data includes photographic imagery of terrain and obstacles for each golf hole within the selected golf course.

In some embodiments, the sensor data is obtained from an optical sensor, such as a photographic camera or a LiDAR sensor.

In some embodiments, the golf-related data includes distance mark-ups and elevation deltas for individual golf holes within the selected golf course.

In some embodiments, the golf-related data includes putting-green maps corresponding to individual golf holes within the selected golf course, and wherein the putting-green maps include contour lines to indicate elevation change.

In some embodiments, the golf-related data includes interactive user-input fields corresponding to individual golf holes within the selected golf course. The interactive user-input fields may allow input by the user of shot distance, club selection, golf-hole characteristics, player performance, environmental conditions, hole notes, or a combination thereof.

In some embodiments, the electronic golf guidebook is further configured to enable images of the interactive user-input fields to be captured, uploaded onto a remote server, converted into user data via optical recognition, analyzed, and synchronized with the mobile application to generate one or more insights to aid the user in tracking performance, identifying areas of improvement, and/or informing future golf strategy.

In some embodiments, the electronic golf guidebook integrates real-time GPS user positioning with geospatial data.

In some embodiments, the electronic golf guidebook adjusts advice to the user based on real-time environmental conditions.

In some embodiments, the electronic golf guidebook utilizes automatic data synchronization including data compression and decompression to minimize network usage.

The electronic golf guidebook may utilize artificial intelligence to generate personalized advice for the user.

The electronic golf guidebook generates real-time advice to the user based on a real-time advice algorithm employing machine learning.

The electronic golf guidebook may utilize a real-time data feed based on an adaptive and dynamic algorithm employing machine learning.

The electronic golf guidebook may employ machine learning to analyze user performance and provide feedback to the user.

In some embodiments, the electronic golf guidebook utilizes virtual reality and/or augmented reality to provide an enhanced user experience.

The electronic golf guidebook may be integrated with or into a wearable device and/or a smart golf club.

In some embodiments, the electronic golf guidebook promotes community engagement via data sharing, advice swapping, and/or competitions among golfers.

In certain embodiments, the electronic golf guidebook utilizes an inverted color scheme comprising a dark background with light text, to enhance visibility in direct sunlight.

DETAILED DESCRIPTION OF EMBODIMENTS OF THE INVENTION

Since golf's inception, players have sought strategic and tactical advantages. Traditional methods like course drawings, mark-ups, and "yard books" have long served as guides. With technological evolution, satellite imagery became a valuable source for golf yard books. However, satellite imagery's resolution limits led to their conversion into graphical representations rather than actual photo imagery.

While Unmanned Aerial Vehicles (UAVs) or drones have seen prior application in golf, particularly for turf management and operational purposes, their potential to provide high-resolution information directly beneficial to golfers remained largely untapped. With the Aces Guide system, we pioneered the innovative use of this technology, harnessing the detailed data captured by UAVs to provide unparalleled insights and information to golfers, as detailed in this patent application. The market sees a growing need for enhanced methods and systems leveraging UAVs and related technologies. These tools should present higher-resolution golf course information to empower golfers to play more efficiently. What's needed is an effective platform that provides golfers with accessible knowledge to help lower their scores and increase their game enjoyment.

Some embodiments of the present invention relate to the Aces Guide®, a registered trademark that is commonly owned by the Applicant of the present patent application.

The Aces Guide answers these needs in the marketplace. More than just a guidebook, the Aces Guide is an indispensable tool that elevates a golfer's game. This robust, portable golf course guidebook enhances a golfer's strategic understanding and overall course experience.

Crafted with a compact, durable design, the Aces Guide features high-resolution aerial images captured by UAVs, detailed course information, and unique features like "The Aces View" and "Green Zone Intelligence" described below. These features provide an in-depth analysis of each hole, enabling strategic planning and efficient play.

The Aces Guide combines the functionalities of a guidebook and a tool. It guides players on hole-by-hole tactics and green zone details and provides an area for performance tracking. Furthermore, the Aces Guide is an orientation tool, with compass directions integrated into the hole maps and Green Zone Intelligence pages.

Through the Aces Guide, golfers' approach transforms from a traditional ground-based one to a comprehensive, informed strategy. The Aces Guide is designed to assist golfers before, during, and after their rounds, offering a strategic edge and an enriched golfing experience.

Overall, the Aces Guide marks a shift in golfing tools, combining high-resolution imagery, detailed information, and strategic features in a compact, robust design. It sets a new standard in the marketplace, meeting the evolving needs of golfers and enhancing their game like never before.

The devices, systems, and methods of the present invention will now be described in detail by reference to various non-limiting embodiments.

Unless otherwise indicated, all numbers expressing parameters and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

As used in this specification and the appended claims, the singular forms "a," "an," and "the" include plural referents unless the context clearly indicates otherwise.

The principles of this invention are described primarily with reference to golf, but it should be recognized that the principles of the invention can be applied to many other sports and activities, particularly those requiring strategic decision-making based on complex data inputs. Essentially, any activity that can benefit from data-driven advice and strategies can utilize the present invention.

Some variations of the present invention are premised on the realization that physical guidebooks and mobile-computing applications may allow users to utilize data captured from Unmanned Aerial Vehicles (UAVs), analyze these data, and present actionable insights in a user-friendly format.

In a preferred embodiment, a guidebook is provided which will assist golfers in improving their golf game by leveraging data gathered from Unmanned Aerial Vehicles (UAVs). The guidebook distills this data into actionable advice and strategies that can be easily understood and implemented by golfers. The guidebook is the initial form of the present invention, and other embodiments, such as a mobile application, will also be described.

The term "computer" is to be interpreted broadly herein to include desktop computers, laptop computers, handheld and other portable computers and organizers, mobile phones, tablets, handheld GPS devices, and so on, whether stand-alone or part of a network.

This invention may be implemented on any current or future computer device. Current examples include but are not limited to, a Mac or PC laptop, Android, IOS, BlackBerry, Windows Phone, and various tablet devices.

A "graphical user interface" is to be interpreted broadly herein to include screens or the like associated with computers, mobile phones, handheld and portable computers and organizers, tablets, etc.

A "network" can be a restricted user network (such as an intranet or local area network) or maybe a global user network (such as the Internet).

A "computer server" (or "server computer," or "server") for the purposes of the present invention includes a processor and memory and is capable of communicating on a computer network, such as the Internet. The server provides a link to the network, which is itself linked to a plurality of user computers or other network devices. The server itself can also be a network of individual computers or processing units, embodying the principles of distributed or "cloud" computing. In this context, it forms the backbone of a "cloud-based platform," as referred to in this invention. This cloud-based platform is also designed to establish connections with external data feeds, such as weather or other data sources, to enrich the insights provided by the invention. The term "Internet" as used herein is intended to embrace generically all types of public and/or private communication networks using wireless and/or wired transmission media and combinations of the above.

A "cloud-based platform," as referred to in this invention, involves using a network of remote servers hosted on the Internet (the "cloud") to store, manage, process, and retrieve data, rather than relying on a local server or a personal computer. The cloud-based platform enables the access and sharing of data and computational resources efficiently across different devices and geographical locations. Furthermore, the cloud-based platform is capable of integrating with various external data feeds, such as weather or other data sources, to enrich the data analysis and insights provided by the invention.

Any information may be stored on a site or host computer accessible via the network. Calculations may be performed in whole or in part on the guidebook, mobile device, on the remote server or servers, or in the cloud (i.e., calculations performed in a distributed way over the Internet).

Overall, the Aces Guide marks a shift in golfing tools, combining high-resolution imagery, detailed information, and strategic features in a compact, robust design. It sets a new standard in the marketplace, meeting the evolving needs of golfers and enhancing their game like never before.

In greater detail, the Aces Guide begins with a front cover that features a high-resolution aerial image of the golf course. The cover may be made of heavy stock synthetic polypropylene based material, giving it the durability to withstand the rigors of a golf round and the portability to be carried around conveniently.

As the guide is opened, golfers are greeted with an orthomosaic map of the entire course. This map, combined with the exact address and a compass direction, aids in overall course navigation and hole identification.

The detailed guide information starts with a yard card page. This page serves as a summary, showcasing yardages and par information for each tee box. It also provides total yardage and par for the entire course, along with the front and back nine separately. This gives golfers an overview of what to expect on the course and helps them strategize.

Following this is the Hole-by-Hole overview page. It provides a course layout map featuring all the holes, par information, and total yardages for both the front and back nine. This quick reference guide serves as an easy way to plan ahead for each hole.

In the Aces View section, each hole is explored in detail with the following features:

Basic hole information, including hole number, par, and yardage.

Yardages from all tee boxes to the center of the green.

Distances from all tee boxes to specific points in the fairway, assisting in shot placement strategy.

At least two distance markers per hole, offering tactical insight.

A high-resolution color ortho-mosaic map of the hole at the center of the page.

Color corresponding markers for all tee boxes to provide a clear understanding of distances.

A distance from the center of the green to circle markers at the appropriate distances on the fairway.

An elevation delta table, which provides elevation deltas in feet from key points to the center of the green.

A text box with strategic tips and tricks for the hole.

An optional QR code that can link to a webpage with more detailed information about the hole.

A compass on the hole map for understanding the orientation of the grass blades and the sun's position, subtly influencing the roll of a golf ball on the green.

Complementing the Aces View, the Green Zone Intelligence page provides an in-depth analysis of each hole's green with the following features:

Green size details, offering insights on the potential landing area.

A compass for orientation, providing a reference for the golfer's approach to the green.

A high-resolution image of the green with topographical contours and a grid overlay, providing a clear understanding of the green's layout and shape.

Contour reading tips, aiding in the understanding and interpretation of the contours.

A hole tracking table for performance tracking and improvement over time, supporting goal setting and tracking progress.

A compass on the Green Zone Intelligence page to help golfers understand the orientation of the green.

These detailed views enable golfers to strategize their shots, understand the green's contours, and track their performance over time, transforming the Aces Guide from a guidebook to a powerful golfing tool.

The Aces Guide culminates in a section dedicated to personal and course-wide notes, allowing golfers to jot down their thoughts, insights, and lessons from the round. This section can be used for performance review, self-assessment, and goal setting for future rounds.

Credit is given to the author of the Aces Guide tips and tricks on the final pages, along with a Quick Key section that includes a QR code and guide symbols. The QR code can be scanned to access a digital version of the guide, making it even more accessible and convenient to use.

The inside back cover mirrors the front cover with another aerial image of the golf course, and the outside back cover features a bold aerial image or a high-resolution golf course logo. The title "Aces Guide" is prominently displayed on both covers, ensuring visibility and brand recognition when the guide is pocketed.

FIG. 1 is an exemplary graphical illustration of a page of a physical guidebook with golf-related data pertaining to one golf hole, showing high-resolution photographic imagery of terrain and obstacles, distance mark-ups, elevation deltas, and written strategy, tips, and tricks applicable to the golf hole.

Figure 2:
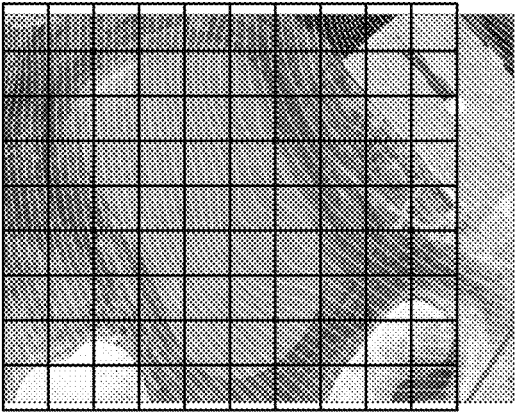
FIG. 2 is an exemplary graphical illustration of a page of a physical guidebook with golf-related data pertaining to the same golf hole as for FIG. 1, showing putting-green maps with elevation contour lines, a hole tracking table, and hole notes.

FIG. 2 is an exemplary graphical illustration of a page of a physical guidebook with golf-related data pertaining to the same golf hole as for FIG. 1, showing putting-green maps with elevation contour lines, a hole tracking table, and hole notes.

In terms of physical features, the Aces Guide boasts rounded corners, providing a smooth and sleek design that not only looks professional but also functionally ensures the Aces Guide can be easily handled and pocketed without damage or discomfort.

As a whole, the Aces Guide, with its in-depth yet easy-to-understand features, serves as a comprehensive tool for golfers of all levels. It enhances the golfing experience by improving strategic understanding and providing all necessary information in one compact and durable format.

In some embodiments of the invention, the creation of the Aces Guide commences with the acquisition of high-resolution aerial imagery and terrain data for the golf course. This collection is predominantly carried out using a professional-grade drone furnished with high-resolution electro-optical cameras and, in certain instances, light detection and ranging (Lidar) equipment. The flight plan is systematically designed and enhanced using advanced computer algorithms, including least squares optimization routines, to ensure exhaustive coverage of the golf course and its immediate vicinity. This ensures the procurement of essential data for subsequent analysis.

The raw data, once collected, is relayed to a cloud-based storage system where it undergoes a sophisticated post-processing workflow using specialized computer algorithms. Within this digital environment, the data is transformed into meaningful outputs. One of the primary outputs is a high-resolution orthomosaic image of the course.

Additionally, 3D models, as well as digital terrain and surface models, are produced. These models grant users a more in-depth context, understanding, and visualization of the course layout and features. Notably, metadata from these files, including precise GPS coordinates (x, y, z), aids in the systematic organization and processing of this data. A central database, under the control of the technology owner/operator, securely houses these processed images and models, ensuring efficient access and utilization. The ultra-high-resolution 2D orthomosaic GeoTIFF, once generated, is securely stored in our centralized cloud-based system. This key output from the initial data processing serves as a foundational element in subsequent processing and analysis stages.

This GeoTIFF file, distinguished by its unparalleled detail and accuracy, embodies a precise representation of the golf course. Moreover, by leveraging state-of-the-art computing capabilities and algorithms, this file becomes instrumental in crafting detailed visuals and in deriving exact measurements critical for the Aces Guide. The ultra-high-resolution 2D orthomosaic, which represents a highly detailed and accurate depiction of the golf course, is stored as a GeoTIFF file format.

This orthomosaic GeoTIFF is then imported into advanced 3D geographical tools. Within these tools, it is layered with other critical intelligence layers, such as Digital Surface Models (DSM), Digital Terrain Models (DTM), and contour data. By integrating these layers of information, a comprehensive analysis of the golf course becomes possible. This rich composite of data is instrumental in calculating the detailed yardages, elevation deltas, contours, and other essential elements that the Aces Guide offers.

In addition to the 3D geographical analysis, the orthomosaic also preferably undergoes an aesthetic enhancement process. Using sophisticated photo-processing tools, the image quality may be enhanced to ensure a visually pleasing look and feel for the Aces Guide. Adjustments to color balance, brightness, contrast, and sharpness, among other properties, ensure that the guide presents a vibrant and attractive representation of the golf course.

Furthermore, the orthomosaic is deconstructed into individual hole images. This process allows each hole to be represented separately, facilitating a detailed hole-by-hole analysis and guide creation. It also makes the information more digestible and convenient for golfers as they navigate through the course.

With these processes, the orthomosaic transforms from a high-resolution image into a core element of the Aces Guide, providing both an aesthetic visual and a base layer for further analysis and intelligence. This information ultimately aids golfers in their strategy development and understanding of the course, contributing to a more enjoyable and successful golfing experience.

The process of creating the Aces Guide commences with the determination of the overall design aesthetic. The color scheme plays a pivotal role in this stage, and a dark background color is typically chosen to provide a strong contrast with the vibrant imagery and text, enhancing the readability and visual appeal of the guide. Alongside the color scheme, other design elements such as typography, layout, and iconography are carefully chosen and harmonized to ensure a consistent and professional appearance throughout the guide.

With the design elements defined, the Aces Guide is then constructed using the high-resolution maps and models derived from the previous steps. These assets provide the foundation upon which the rest of the guide is built. The high-resolution orthomosaic, DSM, DTM, contour lines, and other outputs, combined with the calculated yardages and elevation deltas, are meticulously incorporated, by electronic computerized means, into the guide to provide golfers with a detailed and accurate understanding of each hole.

Detailed elements from the Aces View and the Green Zone Intelligence are then incorporated. For the Aces View, this includes basic hole information, yardages, distance markers, elevation delta tables, strategic tips, and a high-resolution color orthomosaic map of each hole. For the Green Zone Intelligence, green size details, a high-resolution image of the green with topographical contours and a grid overlay, contour reading tips, a hole tracking table, and a compass for orientation are included.

Additional sections, such as the yard card page, hole-by-hole overview page, and the note-taking sections, are designed and incorporated into the guide using the same design aesthetic. These sections supplement the detailed hole analysis, providing golfers with a summary of the course and a space to record their thoughts, insights, and lessons from each round.

All components of the guide are assembled with the aid of computer software, ensuring a meticulous integration of the diverse data sets. This digital assembly undergoes a stringent proofreading and fine-tuning process to guarantee its accuracy and superior quality. The resulting Aces Guide can be presented in two formats. Firstly, as a printed hard copy, providing users with a tactile, visually appealing, and durable guide. Alternatively, the guide can be retained in a digital format, making it accessible on devices like smartphones or tablets. Whether in print or digital, the Aces Guide enhances the golfing experience by elevating strategic understanding and consolidating essential golf course information into one comprehensive resource. As a whole, these steps create an Aces Guide that is both visually appealing and brimming with useful information. The guide not only helps golfers understand and navigate the course, but it also assists them in strategizing their game, making the Aces Guide an indispensable tool for any golfer.

In some variations of the invention, the Aces Guide incorporates pre-round preparation, in-round usage, post-round analysis, and future digital application as follows:

Pre-round Preparation: The Aces Guide is not only a tool but also a method for improving a golfer's performance and experience. One of its fundamental principles is encouraging golfers to visualize their game before stepping onto the course. As part of their pre-round preparation, golfers are urged to carefully review each hole using the Aces Guide. They are prompted to engage their imagination, envisaging potential strategies and outcomes based on the detailed information provided in the guide.

To aid in this visualization process, golfers are encouraged to actively interact with the Aces Guide, annotating its pages with their personalized notes, tips, and tricks. The act of writing aids memory retention and serves to further engrain their strategic thinking for each hole. By incorporating personal experience points and strategic annotations on the maps and Green Zone Intelligence, golfers can create a customized plan that suits their playing style and proficiency.

This pre-round preparation process is a distinctive feature of the Aces Guide, setting it apart from other yardage books or in-round GPS tools that are primarily designed for tactical in-round usage. The Aces Guide focuses on strategic understanding and preparation, promoting an in-depth engagement with the course that extends beyond mere in-round tactical adjustments.

In-Round Usage: During the round, the Aces Guide serves as a convenient, compact, and comprehensive reference. Golfers can refer to the guide as they play each hole, using the detailed information, personalized annotations, and strategic advice to navigate the course effectively. The Aces Guide is designed to be easy-to-understand and quick to refer, minimizing any disruptions to the flow of the game. This unique blend of strategic guidance, personalized strategy, and practical usability makes the Aces Guide an indispensable tool during a round of golf.

Post-Round Analysis: After the round, golfers can further utilize the Aces Guide for analysis and reflection. They can compare their pre-round plans and actual outcomes, identifying areas where they performed well and where improvements can be made. This process of post-round analysis aids in continuous learning and improvement, helping golfers to refine their strategies and enhance their performance in future rounds.

The Aces Guide system offers both a physical guidebook and a fully independent all-digital embodiment. The digital version, accessible via a mobile app, provides golfers with real-time information such as weather conditions, wind speed, and GPS data. While the mobile app can synchronize and complement the content of the physical guide for a richer user experience, it is also designed to operate wholly independently, serving those who prefer a completely digital interaction. This dual approach ensures that the Aces Guide caters to a broad range of user preferences, from traditionalists to tech enthusiasts.

In some embodiments, the system utilizes artificial intelligence to generate personalized advice based on the golfer's location and shot specifics. It provides real-time strategic tips during the round, tailored to the golfer's current situation and conditions.

In some embodiments, the Aces Guide incorporates a cloud-based platform where golfers upload photos of their annotated Aces Guide pages and scorecards. Using optical recognition techniques, the photos are converted into data and ingested into the cloud-based system. This data is then analyzed to provide golfers with in-depth insights into their performance, helping them understand and visualize their game in new ways. Data synchronization between the physical Aces Guide golf guidebook and the mobile application, as well as between other smart devices, is an integral part of the system and enhances the user experience by allowing for seamless data flow and updates. Here we discuss the types of data, the synchronization process, network requirements, and privacy and security measures.

The data types that are synchronized include, but are not limited to, golf-related data on a per-hole basis. This can encompass the number of putts, fairways hit, strokes, and potentially more intricate details such as club selection and shot-level details. Such data provides valuable insights for users and helps them refine their strategies and improve their performance over time.

The synchronization process is initiated when a user inputs data into the physical golf guidebook or the mobile application. Once inputted, the data is stored temporarily on the local device. The mobile application regularly checks for any new data and when detected, begins the process of synchronization.

To ensure the efficiency of the data transmission, the system compresses the data before transmission, and decompresses it after receipt on the other side. This process ensures minimal network usage and faster synchronization speeds. The mobile application is designed to work in the background and synchronize the data without any explicit action required from the user.

Data synchronization can occur over various types of networks, including but not limited to Bluetooth, WiFi, and cellular data networks. The exact network used can depend on the user's device settings and available network connections. If no network is available, the application will store the data and attempt to synchronize it when a connection becomes available.

Maintaining user data privacy and security is a key concern. The system employs several measures to ensure this. First, the data is encrypted before transmission, using secure encryption algorithms. This ensures that even if the data were to be intercepted during transmission, it would be unintelligible to unauthorized users.

Furthermore, the system adheres to all relevant data privacy laws and regulations. Users can choose what data they wish to synchronize and have control over their data at all times. The application also provides user-friendly interface options for managing data synchronization and privacy settings.

The use of a cloud-based platform for data synchronization provides several advantages. Cloud storage provides an additional layer of data backup, preventing loss of data in the event of device damage or loss. It also allows for easy access to data from multiple devices and locations. The cloud-based platform is designed to scale, allowing it to handle large volumes of data and many users simultaneously. It also has the capacity to integrate with various external data feeds, such as weather data, to provide additional insights to the user.

Certain embodiments of the present invention integrate a real-time advice algorithm to enrich the golfing experience of users.

The real-time advice algorithm leverages player profile data, GPS location data, current and target elevation data, and insights from local golf professionals.

Player profile data incorporates historical performance and preferences of the golfer. This data tailors the advice provided by the system to be specific to the golfer's skill set and playing style.

GPS location data is a crucial component, offering advice pertinent to the golfer's precise position on the golf course. The real-time advice algorithm integrates this GPS location data with the information provided in the physical guidebook and the mobile application for the most relevant advice.

Current and target elevation data are employed by the real-time advice algorithm to fine-tune the advice according to the elevation of the golfer's current position and the target hole's elevation. This element allows the system to account for the impact of changes in elevation on the trajectory and distance of the golf shot.

Insights from local golf professionals may be incorporated into the system. This information provides golfers with expert knowledge specific to particular holes or areas on the golf course.

The real-time advice algorithm processes these multiple inputs, and delivers actionable advice to improve the golfer's game. The system adjusts the advice dynamically based on changing conditions and the performance of the golfer.

A crucial aspect of the Aces Guide system's functionality is its ability to provide real-time updates based on the user's location. This is facilitated through the integration and utilization of geolocation data from the user's mobile device and the precisely mapped Aces Guide golf course data.

The system uses the GPS location data from the user's mobile device to determine their exact position on the golf course. This data is then integrated with the golf course data derived from the physical guidebook and the mobile application.

Based on this integrated data, the real-time advice algorithm generates advice that is specific to the golfer's current location on the course. This advice takes into account factors such as the user's current hole, their performance on previous holes, and the specific features of the golf course.

In addition to the user's horizontal position, the system also considers the current and target elevation data. This allows the advice algorithm to account for changes in elevation that could affect the trajectory and distance of the user's shots. For example, a shot that is hit uphill will typically travel a shorter distance than a shot hit on flat ground, and the algorithm factors this into its advice.

The real-time updates are not static but are dynamically updated as the user moves around the golf course and as new data becomes available. This ensures that the advice provided is always relevant and up-to-date, enabling the golfer to make informed decisions about their game strategy.

Image Capture and Conversion: Several aspects of the present invention hinge on the ability to capture and convert images into actionable data. The technology deployed for this purpose can utilize a variety of optical recognition techniques, including but not limited to Optical Character Recognition (OCR) and Intelligent Character Recognition (ICR).

The types of data captured and converted primarily include golf-related metrics such as scores, strokes, putts, fairways hit, club selection, shot details, and any notes made in the Aces Guide. Images of these data, captured from guidebook pages or scorecards, can be taken using a user's mobile device and then uploaded to a cloud-based platform for further processing.

Optical Character Recognition (OCR) is a technology that recognizes text within a digital image and converts it into editable and searchable data. This technology is particularly efficient at extracting printed text from images.

Intelligent Character Recognition (ICR), a more advanced form of OCR, is capable of recognizing hand-written text and converting it into digital text. This is particularly relevant for users who may jot down their scores or other notes by hand in the physical guidebook or on scorecards.

Once the images are converted into structured data through these optical recognition techniques, they are ready for analysis. The data points extracted from these images are parsed, analyzed, and integrated with the other data in the system. These data are used in conjunction with the real-time advice algorithm to provide users with personalized advice and insights.

In the context of the mobile application, these image capture and conversion capabilities play a critical role. The mobile application has been developed to support image capture, data conversion using OCR and ICR, and data analysis. Through these capabilities, the application is capable of providing a seamless and enriching experience for the golfer.

An integral feature of the Aces Guide system is its ability to adapt to changing conditions, including changes in weather, lighting, and the golfer's performance. This is achieved through the integration of real-time data feeds and adaptive algorithms.

The system can receive real-time weather data, such as temperature, wind speed and direction, humidity, and barometric pressure, from external data feeds. It takes this information into account when providing advice and insights. For instance, a golfer might be advised to use a different club or adjust their swing if it is particularly windy.

Lighting conditions can also impact the golfer's game. The system uses the device's sensors, like the ambient light sensor, to determine the lighting conditions. This data can influence the advice provided to the golfer, particularly in terms of visibility and shot direction.

The Aces Guide system monitors the golfer's performance in real-time and adapts its advice accordingly. By analyzing data such as the golfer's score, number of strokes, fairways Additionally, the system allows for manual adaptations based on user input. For instance, a golfer can manually adjust their preferred club selection or their perceived performance level, which the system would then take into account when providing advice.

Therefore, the Aces Guide system dynamically adapts its advice based on changing environmental conditions and golfer performance, providing tailored advice to help golfers improve their game under any circumstances.

Application of Machine Learning: The system's ability to provide valuable insights and advice is largely predicated on the application of machine learning, in some embodiments. These algorithms are used to analyze the data derived from the physical guidebook, the mobile application, and external data sources.

In the context of the Aces Guide system, machine learning plays a crucial role in interpreting vast quantities of data and using it to provide actionable advice to the user. These machine learning algorithms can be of various types, including but not limited to decision trees, neural networks, and clustering algorithms, each serving specific functions based on the nature of the data and the type of insights needed.

The machine learning algorithms are trained using a large dataset composed of golf-related data points. This dataset includes but is not limited to scores, strokes, putts, fairways hit, club selection, shot details, GPS location data, and elevation data. Over time, as more data is collected and fed into the system, the algorithms continually learn and improve, enabling them to provide increasingly accurate advice.

Insights derived from these machine learning processes are used to provide advice to users. This advice is dynamically updated based on new data, ensuring that users always have the most accurate and relevant advice at their disposal. The system is designed to consider recent performance, changing conditions, and user preferences when generating advice.

The machine learning insights enhance the user's game strategy by providing specific, data-driven advice on various aspects of their game. For example, the system may suggest a specific club based on the user's past performance with different clubs, or it might offer advice on how to approach a particular hole based on a combination of user performance data, GPS and elevation data, and expert advice from golf pros.

In some embodiments, the Aces Guide integrates Augmented Reality (AR) technology for an enhanced user experience. By donning AR glasses enabled with the Aces Guide system, golfers can benefit from a seamless fusion of digital data with their real-world view. Data such as distances to the hole, hazards, and other key points of interest can be visually projected onto the golfer's field of view.

The AR glasses function like a virtual caddy, offering real-time advice based on the golfer's current situation. Depending on the golfer's location, distance to the hole, and current environmental conditions, the AR glasses can suggest the most suitable club to use.

In addition to raw data, AR glasses can provide real-time strategic advice. This could involve suggesting the optimal path for the golf ball, incorporating considerations like wind direction, wind speed, elevation changes, and course obstacles.

The AR glasses can potentially provide immediate feedback on the golfer's swing mechanics based on data captured by the glasses or connected devices. This interactive feedback fosters rapid learning and skill improvement.

The advice given through the AR glasses is personalized, drawing from the golfer's past performance data and player profile. The glasses connect to the cloud-based platform, and the real-time advice algorithm is used to generate these insights.

In some embodiments, Virtual Reality (VR) technology is incorporated to provide interactive course guides and performance simulations. Golfers can explore a virtual replica of the golf course, gaining an understanding of its layout and features, even before physically stepping onto the course.

VR technology also enables performance simulations, allowing golfers to virtually practice their swings and understand the potential outcome of their shots. This immersive environment aids in strategizing and improves their confidence.

In certain embodiments, both AR technology and VR technology are incorporated. The incorporation of AR and/or VR technologies significantly enriches the golfer's experience, offering actionable advice and insights in an intuitive and immersive manner. The fusion of these technologies with the Aces Guide system makes golfing a more data-driven and enjoyable activity.

The Aces Guide system gathers an extensive range of data tied to the golfer's performance, such as scores, strokes, putts, fairways hit, club selection, shot specifics, and beyond. This data is processed via a comprehensive set of sophisticated analytical algorithms, capable of identifying trends, calculating averages, and performing a variety of other statistical analyses.

To complement the traditional performance metrics, the system offers an interactive performance dashboard that displays key performance indicators. It gives the golfer an easy-to-grasp visualization of their progress over time. The dashboard also has a goal-setting functionality, allowing golfers to specify personal goals for different performance metrics and monitor their progress toward achieving them.

The Aces Guide introduces a badge-earning feature to promote progress and ongoing improvement. Golfers earn badges for reaching certain milestones or achieving predefined goals, which serve as both recognition and motivation.

The system generates performance reports by leveraging collected data and insights derived from the analytical algorithms. These reports can be accessed via the Aces Guide mobile application or the cloud-based platform's web portal.

The reports are designed to be intuitive and customizable, enabling golfers to focus on their most valued metrics. They include data visualizations like graphs and charts to make it easier for golfers to comprehend their performance trends.

Report generation can be automated on a user-set schedule, such as daily, weekly, or monthly, or golfers can manually request a report at any given time.

The Aces Guide system's capability of providing in-depth performance analysis and personalized reports provides golfers with the tools necessary to enhance their game. With the ability to track progress, set goals, and earn badges, the system makes the golfing experience rewarding and enjoyable.

The Aces Guide system is engineered with capabilities to cultivate an interactive community of golf enthusiasts. This is achieved through a suite of features fostering user interaction and knowledge exchange.

The system endows users with the capability to disseminate personal insights, strategies, and tips derived from their individual golfing experiences. This shared knowledge pool ranges from course-specific advice to general golfing tactics, enhancing the collective intelligence within the community.

An integral feature is user-driven golf course reviews, allowing users to provide assessments based on various parameters like course layout, level of difficulty, and amenities. This reciprocal feedback mechanism assists fellow users in selecting golf courses judiciously.

A built-in networking feature enables users to establish connections with other golfers using criteria such as geographical location, skill level, and preferred playing times. This enhances the possibility of finding suitable golfing partners and broadening one's golfing network.

Competitions can be organized within the platform, facilitated by features that allow users to arrange matches or tournaments, establish rules, invite participants, and manage scores. This fosters a sense of community and friendly rivalry among users.

In addition, the system incorporates social networking features to augment user interaction and community engagement. Users can follow, comment on, and share each other's posts, creating an engaging golfing community within the Aces Guide system. This suite of features not only enhances the individual golfing experience but also contributes to a robust and dynamic golfing community, enriching the golfing experience for all users.

In this detailed description, reference has been made to multiple embodiments and to the accompanying figures in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A golf guidebook comprising a plurality of physical pages having golf-course-related data printed thereon to display said golf-course-related data to a user, wherein said golf-course-related data pertains to a selected golf course, wherein at least some of said golf-course-related data is computationally derived from sensor data captured from an unmanned aerial vehicle remotely and controllably flown above said selected golf course, wherein said golf-course-related data includes ultra-high-resolution two-dimensional orthomosaic photographic imagery, a digital surface model, a digital terrain model, and contour data of the terrain and obstacles for each golf hole within said selected golf course, wherein said ultra-high-resolution two-dimensional orthomosaic photographic imagery, said digital surface model, said digital terrain model, and said contour data create a three-dimensional model for said selected golf course, and wherein said golf guidebook has a guidebook areal size of less than 60 square inches, and wherein said golf guidebook includes reusable or replaceable pages to record multiple rounds of golf by said user on said selected golf course.

2. The golf guidebook of claim 1, wherein said sensor data is obtained from an optical sensor.

3. The golf guidebook of claim 2, wherein said optical sensor is a photographic camera.

4. The golf guidebook of claim 2, wherein said optical sensor is a LiDAR sensor.

5. The golf guidebook of claim 1, wherein said physical pages include distance mark-ups and elevation deltas for individual golf holes within said selected golf course.

6. The golf guidebook of claim 1, wherein said physical pages include putting-green maps corresponding to individual golf holes within said selected golf course, and wherein said putting-green maps include contour lines to indicate elevation change.

7. The golf guidebook of claim 1, wherein said physical pages include interactive user-input fields corresponding to individual golf holes within said selected golf course.

8. The golf guidebook of claim 7, wherein said interactive user-input fields allow input by said user of shot distance, club selection, golf-hole characteristics, player performance, environmental conditions, hole notes, or a combination thereof.

9. The golf guidebook of claim 7, wherein each individual golf hole within said selected golf course is presented on two physical pages in an end-to-end view of said individual golf hole, and wherein said two physical pages includes a hole-specific interactive user-input field.

10. The golf guidebook of claim 7, wherein said golf guidebook is integrated with a mobile application, wherein said golf guidebook is configured to enable images of said interactive user-input fields to be captured, uploaded onto a remote server, converted into user data via optical recognition, analyzed, and synchronized with said mobile application to generate one or more insights to aid said user in tracking performance, identifying areas of improvement, and/or informing future golf strategy.

11. The golf guidebook of claim 1, wherein said golf guidebook includes said reusable pages, and wherein said reusable pages contain erasable surfaces, thereby allowing for repeated use over time.

12. The golf guidebook of claim 1, wherein said golf guidebook is environmentally resistant to rain, wind, sunlight, heat, humidity, dirt, dust, pollution, and mechanical stress.

13. The golf guidebook of claim 1, wherein said golf guidebook utilizes an inverted color scheme to enhance visibility in direct sunlight.

14. The golf guidebook of claim 1, wherein said guidebook areal size is less than 30 square inches.

15. A method of making a golf guidebook, said method comprising:
(a) selecting a golf course for analysis;
(b) controlling an unmanned aerial vehicle to capture sensor data from each golf hole within said golf course;
(c) printing golf-course-related data on a plurality of physical pages corresponding to all of said golf holes, wherein said golf-course-related data pertains to said golf course selected in step (a), wherein said golf-course-related data is computationally derived from said sensor data captured in step (b), and wherein said golf-course-related data includes ultra-high-resolution two-dimensional orthomosaic photographic imagery, a digital surface model, a digital terrain model, and contour data of the terrain and obstacles for all of said golf holes within said golf course selected in step (a);

(d) creating a three-dimensional model for said selected golf course, wherein said three-dimensional model comprises said ultra-high-resolution two-dimensional orthomosaic photographic imagery, said digital surface model, said digital terrain model, and said contour data; and (e) assembling and binding said plurality of physical pages into a golf guidebook that has a guidebook areal size of less than 60 square inches, wherein each individual golf hole within said selected golf course is presented on two physical pages in an end-to-end view of said individual golf hole, and wherein said two physical pages includes a hole-specific interactive user-input field, and wherein said method further comprises capturing images of said interactive user-input fields that contain user-inputted data, uploading said images onto a remote server, converting said images into user data via optical recognition, and then analyzing said user data, thereby generating analyzed user data.

16. The method of claim 15, wherein said sensor data is obtained from an optical sensor.

17. The method of claim 16, wherein said optical sensor is a photographic camera.

18. The method of claim 17, wherein said photographic camera provides an aerial image of the terrain and obstacles of each golf hole within said golf course.

19. The method of claim 16, wherein said optical sensor is a LiDAR sensor.

20. The method of claim 19, wherein said LiDAR sensor provides altitude data to calculate elevation changes within each golf hole.

21. The method of claim 15, wherein one or more physical pages corresponding to each of said golf holes contain details about length, par, hazards, landing areas, and green shapes, based on said sensor data captured by said unmanned aerial vehicle.

22. The method of claim 15, wherein a physical page corresponding to each of said golf holes contains a putting-green map that includes contour lines to indicate elevation change within each putting green corresponding to each of said golf holes, and wherein said contour lines are derived from said sensor data.

23. The method of claim 15, wherein said physical pages include interactive user-input fields corresponding to individual golf holes within said selected golf course.

24. The method of claim 23, wherein said interactive user-input fields allow input by a user of shot distance, club selection, golf-hole characteristics, player performance, environmental conditions, hole notes, or a combination thereof.

25. The method of claim 15, wherein said method further comprises synchronizing said analyzed user data between said golf guidebook and a mobile application.

26. The method of claim 15, wherein said images are captured by a mobile device operated by said user, wherein said mobile device is configured to execute said mobile application, and wherein said mobile device is equipped with camera functionality.

27. The method of claim 15, wherein said analyzed user data is used to generate, on said remote server, one or more insights to aid said user in tracking performance, identifying areas of improvement, and/or informing future golf strategy.

* * * * *